US011087145B2

United States Patent
Tasaki et al.

(10) Patent No.: US 11,087,145 B2
(45) Date of Patent: Aug. 10, 2021

(54) GRADIENT ESTIMATION DEVICE, GRADIENT ESTIMATION METHOD, COMPUTER PROGRAM PRODUCT, AND CONTROLLING SYSTEM

(71) Applicants: Kabushiki Kaisha Toshiba, Minato-ku (JP); Toshiba Electronic Devices & Storage Corporation, Minato-ku (JP)

(72) Inventors: Tsuyoshi Tasaki, Yokohama (JP); Takuya Miyamoto, Kawasaki (JP); Takayuki Sugiura, Yokohama (JP)

(73) Assignees: Kabushiki Kaisha Toshiba, Minato-ku (JP); Toshiba Electronic Devices & Storage Corporation, Minato-ku (JP)

( * ) Notice: Subject to any disclaimer, the term of this patent is extended or adjusted under 35 U.S.C. 154(b) by 83 days.

(21) Appl. No.: 16/125,312

(22) Filed: Sep. 7, 2018

(65) Prior Publication Data

US 2019/0180116 A1    Jun. 13, 2019

(30) Foreign Application Priority Data

Dec. 8, 2017 (JP) .............................. JP2017-235717

(51) Int. Cl.
*G06K 9/00* (2006.01)
*G06T 7/73* (2017.01)
(Continued)

(52) U.S. Cl.
CPC ....... *G06K 9/00798* (2013.01); *G05D 1/0246* (2013.01); *G06K 9/4609* (2013.01);
(Continued)

(58) Field of Classification Search
CPC ............ G06K 9/00798; G06K 9/6215; G06K 9/6202; G06K 9/4609; G06T 7/73;
(Continued)

(56) References Cited

U.S. PATENT DOCUMENTS 5,550,937 A * 8/1996 Bell ...................... G06T 3/0081
                                                          382/278
6,408,105 B1 * 6/2002 Maruo ................... G06T 7/001
                                                          382/190
(Continued)

FOREIGN PATENT DOCUMENTS

EP    2 177 425 A1    4/2010
EP    2 793 184 A1    10/2014
(Continued)

OTHER PUBLICATIONS

Westerhoff, J. et al., "Development and Comparison of Homography based Estimation Techniques for Camera to Road Surface Orientation", 2016 IEEE Intelligent Vehicles Symposium (IV), XP032939094, Jun. 19, 2016, pp. 1034-1040.
(Continued)

*Primary Examiner* — Jess Whittington
*Assistant Examiner* — G. J. L.
(74) *Attorney, Agent, or Firm* — Oblon, McClelland, Maier & Neustadt, L.L.P.

(57) ABSTRACT

According to one embodiment, a gradient estimation device includes one or more processors. The processors acquire a first image and a second image obtained by photographing a surface of an object. The processors extract, from the first image, a first pixel indicating a boundary of an object in a direction different from a gradient direction of the surface, and extract a second pixel corresponding to the first pixel from the second image. The processors calculate gradient magnitude of the surface by transforming at least one of the first image and the second image such that a matching degree between the first pixel and the second pixel is increased.

10 Claims, 12 Drawing Sheets

(51) Int. Cl.
*G05D 1/02* (2020.01)
*G06K 9/46* (2006.01)
*G06K 9/62* (2006.01)

(52) U.S. Cl.
CPC ......... *G06K 9/6202* (2013.01); *G06K 9/6215* (2013.01); *G06T 7/73* (2017.01); *G05D 2201/0213* (2013.01); *G06T 2207/30252* (2013.01)

(58) Field of Classification Search
CPC ........ G06T 2207/30252; G05D 1/0246; G05D 2201/0213
See application file for complete search history.

(56) References Cited

U.S. PATENT DOCUMENTS

| | | | | |
|---|---|---|---|---|
| 6,408,109 | B1* | 6/2002 | Silver | G06T 7/12 382/190 |
| 6,519,372 | B1* | 2/2003 | Eppler | G06K 9/6203 382/278 |
| 6,690,842 | B1* | 2/2004 | Silver | G06T 7/12 382/199 |
| 9,013,284 | B2* | 4/2015 | Nakayama | G10K 15/02 340/384.3 |
| 9,868,323 | B2* | 1/2018 | Tsuzuki | B60C 5/008 |
| 9,984,277 | B2* | 5/2018 | Castro-Gonzalez | A61B 5/14546 |
| 2003/0223615 | A1* | 12/2003 | Keaton | G06T 5/50 382/100 |
| 2005/0018043 | A1* | 1/2005 | Takeda | H04N 7/181 348/119 |
| 2006/0013439 | A1* | 1/2006 | Takeda | G06K 9/00798 382/103 |
| 2006/0210116 | A1* | 9/2006 | Azuma | G06K 9/00798 382/104 |
| 2007/0070365 | A1* | 3/2007 | Boregowda | G06F 16/5838 358/1.9 |
| 2007/0110319 | A1* | 5/2007 | Wyatt | G06K 9/40 382/199 |
| 2008/0063300 | A1* | 3/2008 | Porikli | G06K 9/6206 382/294 |
| 2008/0253606 | A1* | 10/2008 | Fujimaki | G06T 7/85 382/100 |
| 2009/0041337 | A1* | 2/2009 | Nakano | G06K 9/00798 382/154 |
| 2009/0123070 | A1* | 5/2009 | Xiaoying | G06T 7/11 382/176 |
| 2010/0134444 | A1* | 6/2010 | Yahata | G06K 9/00375 345/175 |
| 2011/0293190 | A1* | 12/2011 | O'Callaghan | G06T 7/20 382/197 |
| 2012/0093420 | A1* | 4/2012 | Zhang | G06K 9/4614 382/197 |
| 2012/0173083 | A1* | 7/2012 | Hsu | B60T 8/17554 701/45 |
| 2013/0182896 | A1* | 7/2013 | Azuma | G06K 9/00805 382/103 |
| 2014/0218525 | A1 | 8/2014 | Sellhusen et al. | |
| 2015/0003741 | A1* | 1/2015 | Zhang | G06T 7/33 382/199 |
| 2017/0069072 | A1* | 3/2017 | Sano | G06T 7/593 |
| 2017/0078551 | A1* | 3/2017 | Kweon | H04N 5/2352 |
| 2017/0222612 | A1* | 8/2017 | Zollner | G08G 1/167 |
| 2019/0213746 | A1* | 7/2019 | Azuma | G06T 7/593 |

FOREIGN PATENT DOCUMENTS

| | | |
|---|---|---|
| EP | 2 913 998 A1 | 9/2015 |
| EP | 3 246 205 A1 | 11/2017 |
| WO | WO-2016079117 A1 * | 5/2016 ......... G06K 9/00798 |

OTHER PUBLICATIONS

Zhou, J. et al., "Homography-based Ground Detection for A Mobile Robot Platform Using a Single Camera", IEEE International Conference on Robotics and Automation, May 2006, pp. 4100-4105.

Shigeki Sugimoto, et al., "Efficient Plane-parameter Estimation Using Stereo Images", vol. 48, No. SIG (CVIM)., Feb. 2007, 32 pages (with Machine Generated English Translation).

Shigeki Sugimoto, et al., "Fast Plane Parameter Estimation From Stereo Images", Proceedings of the IAPR Conference on Machine Vision Applications (MVA2007), pp. 567-570, May 16, 2007.

* cited by examiner

1201

1301

1401

GRADIENT ESTIMATION DEVICE, GRADIENT ESTIMATION METHOD, COMPUTER PROGRAM PRODUCT, AND CONTROLLING SYSTEM

CROSS-REFERENCE TO RELATED APPLICATIONS

This application is based upon and claims the benefit of priority from Japanese Patent Application No. 2017-235717, filed on Dec. 8, 2017; the entire contents of which are incorporated herein by reference.

FIELD

Embodiments described herein relate generally to a gradient estimation device, a gradient estimation method, a computer program product, and controlling system.

BACKGROUND

There is a known technique in which a gradient of a plane such as a road surface is estimated by using a plurality of images. For example, proposed is a technique in which a gradient is estimated from a transformation parameter by which one of two images is transformed such that a luminance difference between the two images is eliminated in a set road surface candidate region.

However, in the related art, there may be case where gradient estimation accuracy is deteriorated. For example, in a state of having an error in a position and a posture of an imaging device (camera) that has acquired two images, influence of a white line extending in a gradient direction of a road surface is increased, and there may be a case where the gradient estimation accuracy is largely degraded.

DETAILED DESCRIPTION

According to one embodiment, a gradient estimation device includes one or more processors. The processors acquire a first image and a second image obtained by photographing a surface of an object. The processors extract, from the first image, a first pixel indicating a boundary of an object in a direction different from a gradient direction of the surface, and extract a second pixel corresponding to the first pixel from the second image. The processors calculate gradient magnitude of the surface by transforming at least one of the first image and the second image such that a matching degree between the first pixel and the second pixel is increased.

Preferred embodiments of a gradient estimation device according to the present invention will be described in detail below with reference to the accompanying drawings. In the following, an example in which a moving body includes a gradient estimation device will be described, but applicable examples are not limited thereto.

First Embodiment

A gradient estimation device according to a first embodiment estimates a gradient (gradient magnitude) of a plane (a surface of an object) by extracting, from two images obtained by photographing the plane, pixels aligned in a direction different from a gradient direction of the plane, and transforming the images such that the extracted pixels are more matched. Consequently, influence of a white line extending in the gradient direction can be reduced and gradient estimation accuracy can be improved, for example.

Figure 1:
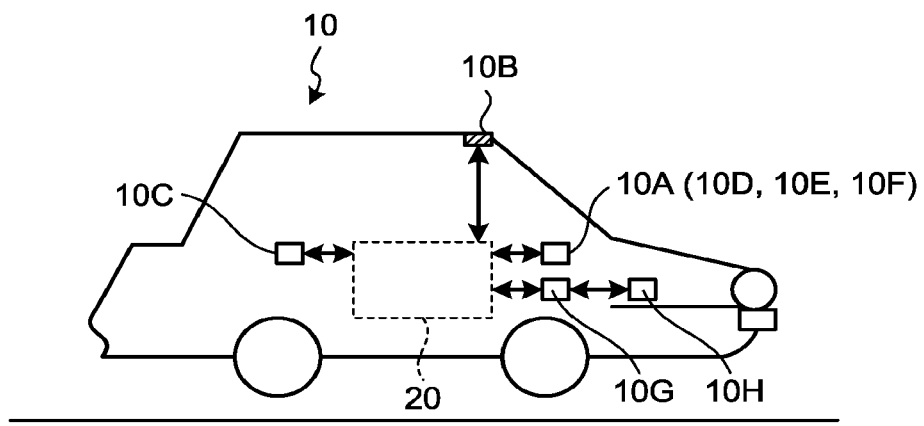
FIG. 1 is a view illustrating an exemplary moving body according to an embodiment.

FIG. 1 is a view illustrating an exemplary moving body 10 according to the present embodiment.

The moving body 10 includes a gradient estimation device 20, an output unit 10A, a sensor 10B, an input device 10C, a power output controller 10G, and a power output unit 10H.

A gradient estimation device 20 estimates a gradient of a photographed plane in an image. The plane includes, for example, a road surface, a ground surface, a water surface, a floor surface, a wall surface, a ceiling surface, or the like existing in a moving direction of the moving body 10. The gradient estimation device 20 is, for example, a dedicated or general purpose computer. In the present embodiment, an exemplary case where the gradient estimation device 20 is mounted on the moving body 10 will be described.

The moving body 10 is a movable object. The moving body 10 is, for example, a vehicle (a motorcycle, an automatic four-wheel vehicle, or a bicycle), a carriage, a robot, a ship, or a flying object (such as an airplane or an unmanned aerial vehicle (UAV)). The moving body 10 is, for example, a moving body that travels by drive operation by a person or a moving body that can automatically travel (autonomously travel) without involving drive operation by a person. The moving body capable of automatically traveling is, for example, an automatic driving vehicle. The description will be provided for an example in which the moving body 10 of the present embodiment is a vehicle that can perform autonomous travel.

Note that the gradient estimation device 20 is not limited to a form mounted on the moving body 10. The gradient estimation device 20 may be mounted on a stationary object. The stationary object is an object that cannot be moved or an object that is in a stationary state with respect to the ground. The stationary object includes, for example, a guardrail, a pole, a parked vehicle, a road sign, and the like. Furthermore, the gradient estimation device 20 may be mounted on a cloud server that executes processing on the cloud.

The output unit 10A outputs various kinds of information. For example, the output unit 10A outputs output information from various kinds of processing.

The output unit 10A includes, for example, a communication function to transmit output information, a display function to display output information, a sound output function to output a sound to indicate output information, and the like. For example, the output unit 10A includes a communication unit 10D, a display 10E, and a speaker 10F.

The communication unit 10D communicates with an external device. The communication unit 10D is a VICS (registered trademark) communication circuit or a dynamic map communication circuit. The communication unit 10D transmits output information to an external device. Additionally, the communication unit 10D receives road information and the like from an external device. The road information includes a signal, a sign, a surrounding building, a road width of each lane, a lane center line, and the like. The road information may be stored in the storage 20B.

The display 10E displays output information. The display 10E is, for example, a known liquid crystal display (LCD), a projection device, a light, or the like. The speaker 10F outputs a sound to indicate output information.

The sensor 10B is a sensor to acquire a travel environment of the moving body 10. For example, the travel environment includes, for example, observation information of the moving body 10 and peripheral information of the moving body 10. The sensor 10B is, for example, an external sensor or an internal sensor.

The internal sensor is a sensor to observe observation information. The observation information includes, for example, an acceleration rate of the moving body 10, a speed of the moving body 10, and an angular velocity of the moving body 10.

The internal sensor is, for example, an inertial measurement unit (IMU), an acceleration sensor, a speed sensor, a rotary encoder, or the like. The IMU observes observation information including a triaxial acceleration rate and a triaxial angular velocity of the moving body 10.

The external sensor observes peripheral information of the moving body 10. The external sensor may be mounted on the moving body 10 or may be mounted on the outside of the moving body 10 (for example, another moving body, an external device, or the like).

The peripheral information is information to indicate a situation in the periphery of the moving body 10. The periphery of the moving body 10 is a region within a predetermined range from the moving body 10. The range is a range that can be observed by the external sensor. The range may be preliminarily set.

The peripheral information includes, for example, a photographed image and distance information of the periphery of the moving body 10. Note that the peripheral information may include positional information of the moving body 10. A photographed image is photographed image data obtained by photographing (hereinafter may be simply referred to as a photographed image). The distance information is information indicating a distance from the moving body 10 to an object. The object is a place that can be observed by the external sensor in the external world. The positional information may be a relative position or an absolute position.

The external sensor include, for example, a photographing device to obtain a photographed image by photographing, a distance sensor (a millimeter wave radar, a laser sensor, or a distance image sensor), a position sensor (a global navigation satellite system (GNSS), a global positioning system (GPS), or a radio communication device), and the like.

A photographed image includes digital image data in which a pixel value is defined per pixel, a depth map in which a distance from the sensor 10B is defined per pixel, and the like. The laser sensor is, for example, a two-dimensional laser imaging detection and ranging (LIDAR) sensor or a three-dimensional LIDAR sensor installed parallel to a horizontal plane.

The input device 10C receives various kinds of commands and information input from a user. The input device 10C is, for example, a pointing device such as a mouse or a track ball, or an input device such as a keyboard. Additionally, the input device 10C may be an input function on a touch panel integrally provided with the display 10E.

The power output controller 10G controls the power output unit 10H. The power output unit 10H is a device mounted on the moving body 10 and used for driving. The power output unit 10H includes, for example, an engine, a motor, a wheel, and the like.

The power output unit 10H is driven under the control of the power output controller 10G. For example, the power output controller 10G determines a peripheral situation on the basis of output information generated by the gradient estimation device 20, information obtained from the sensor 10B, and the like, and controls an acceleration amount, a brake amount, a steering angle, and the like. For example, the power output controller 10G adjusts the acceleration amount and the brake amount in accordance with gradient magnitude estimated by the gradient estimation device 20 such that the moving body 10 is moved at a desired speed.

Figure 2:
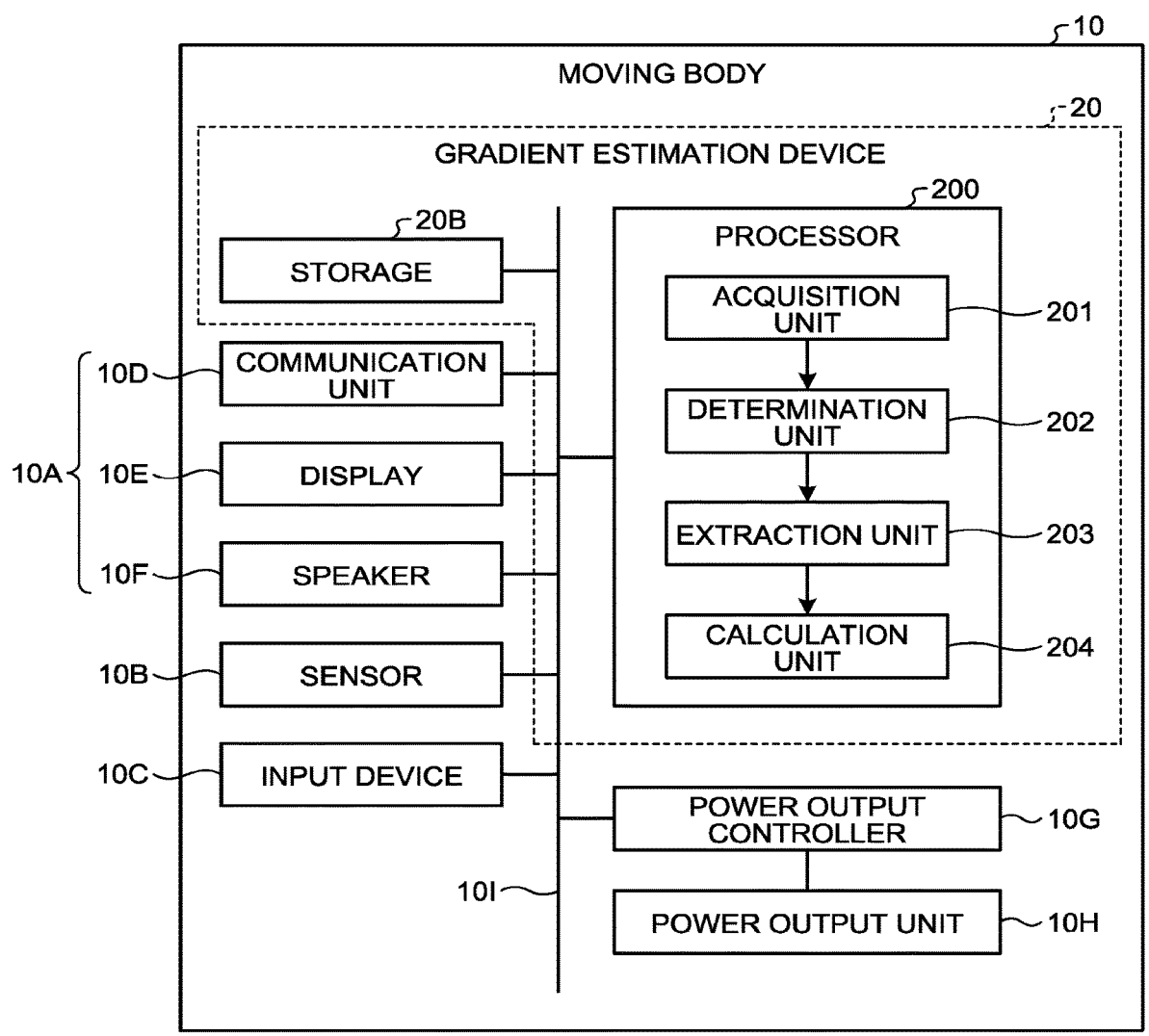
FIG. 2 is a diagram illustrating an exemplary functional configuration of a moving body according to a first embodiment.

Next, an electrical configuration of the moving body 10 will be described in detail. FIG. 2 is a block diagram illustrating an exemplary configuration of the moving body 10.

The moving body 10 includes the gradient estimation device 20, output unit 10A, sensor 10B, input device 10C, power output controller 10G, and power output unit 10H. As described above, the output unit 10A includes the communication unit 10D, display 10E, and speaker 10F.

The gradient estimation device 20, output unit 10A, sensor 10B, input device 10C, and power output controller 10G are connected via a bus 10I. The power output unit 10H is connected to the power output controller 10G.

The gradient estimation device 20 includes the storage 20B and a processor 200. In other words, the output unit 10A, sensor 10B, input device 10C, power output controller 10G, processor 200, and storage 20B are connected via the bus 10I.

Meanwhile, at least one of the storage 20B, output unit 10A (communication unit 10D, display 10E, and speaker 10F), sensor 10B, input device 10C, and power output controller 10G is connected to the processor 200 by a wire or radio. Additionally, at least one of the storage 20B, output unit 10A (communication unit 10D, display 10E, and speaker 10F), sensor 10B, input device 10C, and power output controller 10G is connected to the processor 200 via a network.

The storage 20B stores various kinds of data. The storage 20B is, for example, a random access memory (RAM), a semiconductor memory device such as a flash memory, a hard disk, an optical disk, or the like. Note that the storage 20B may also be provided outside the gradient estimation device 20. Additionally, the storage 20B may also be provided outside the moving body 10. For example, the storage 20B may also be arranged in a server device installed on a cloud.

Furthermore, the storage 20B may also be a storage medium. Specifically, the storage medium may be the one that downloads or temporarily stores a program and various kinds of information via a local area network (LAN), the Internet, or the like. Also, the storage 20B may be formed of plurality of storage media.

The processor 200 includes an acquisition unit 201, a determination unit 202, an extraction unit 203, and a calculation unit 204.

Each of the processing functions in the processor 200 is stored in the storage 20B in a form of a program that can be executed by a computer. The processor 200 is a processor that implements a functional unit corresponding to each program by reading and executing the program from the storage 20B.

The processor 200 having read each program has each of the functional units illustrated in the processor 200 of FIG. 2. In FIG. 2, a description will be provided assuming that the acquisition unit 201, determination unit 202, extraction unit 203, and calculation unit 204 are implemented by the single processor 200.

Note that the processor 200 may be formed by combining a plurality of independent processors in order to implement each of the functions. In this case, each processor implements each function by executing a program. Additionally, there may be a case where each processing function is formed as a program and one processing circuit executes each program, or there may be a case where a specific function is installed in a dedicated independent program execution circuit.

Note that the term "processor" used in the present embodiment represents circuits of, for example, a central processing unit (CPU), a graphical processing unit (GPU), an application specific integrated circuit (ASIC), a programmable logic device (for example, a simple programmable logic device (SPLD)), a complex programmable logic device (CPLD), and a field programmable gate array (FPGA)).

The processor implements a function by reading and executing a program stored in the storage 20B. Note that a program may also be directly incorporated inside a circuit of the processor instead of storing a program in the storage 20B. In this case, the processor implements a function by reading and executing the program incorporated in the circuit.

The acquisition unit 201 acquires images (first image and second image) obtained by photographing a plane. For example, the acquisition unit 201 acquires at least two or more images obtained by photographing the plane of a region for which a gradient is measured, and the images are each provided with a position and a posture of the photographing device (camera) having photographed the images. The acquisition unit 201 may directly acquire an image photographed by the camera from the camera, or may acquire an image stored in the storage medium or the like.

Meanwhile, in a case where a position and a posture of the photographing device can be calculated (estimated) by, for example, analyzing an image, the acquisition unit 201 may acquire an image not provided with a position and a posture of the photographing device.

Figure 3:
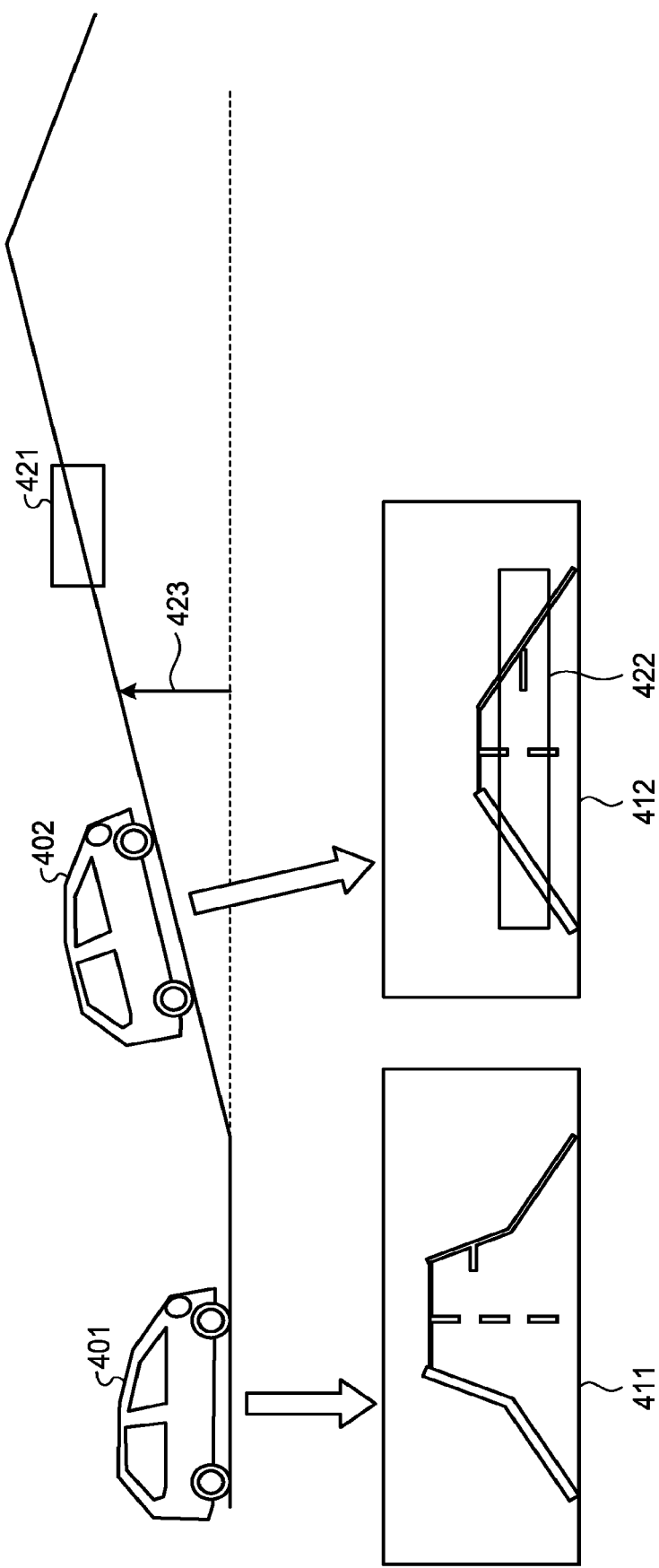
FIG. 3 is a view illustrating exemplary acquired images.

FIG. 3 is a diagram illustrating exemplary acquired images. FIG. 3 illustrates exemplary images obtained by photographing a region 421 for which a gradient is estimated while a camera is installed at a windshield of an automobile (example of the moving body 10) in a manner facing forward. An image 411 represents, for example, an image photographed from an automobile 401 at a time (t−1). An image 412 represents, for example, an image photographed from an automobile 402 at a time t. The automobile 402 corresponds, for example, to the automobile 401 that has been moved to a gradient having magnitude 423. The image 412 includes a region 422 corresponding to the region 421 for which the gradient is estimated.

Meanwhile, in the example of FIG. 3, two images photographed at different times are used, but the two images to be processed are not limited thereto. As far as two images are obtained by photographing the same plane, any image can be used. For example, two images photographed at the same time by a stereo camera or the like may also be used.

Figure 4:
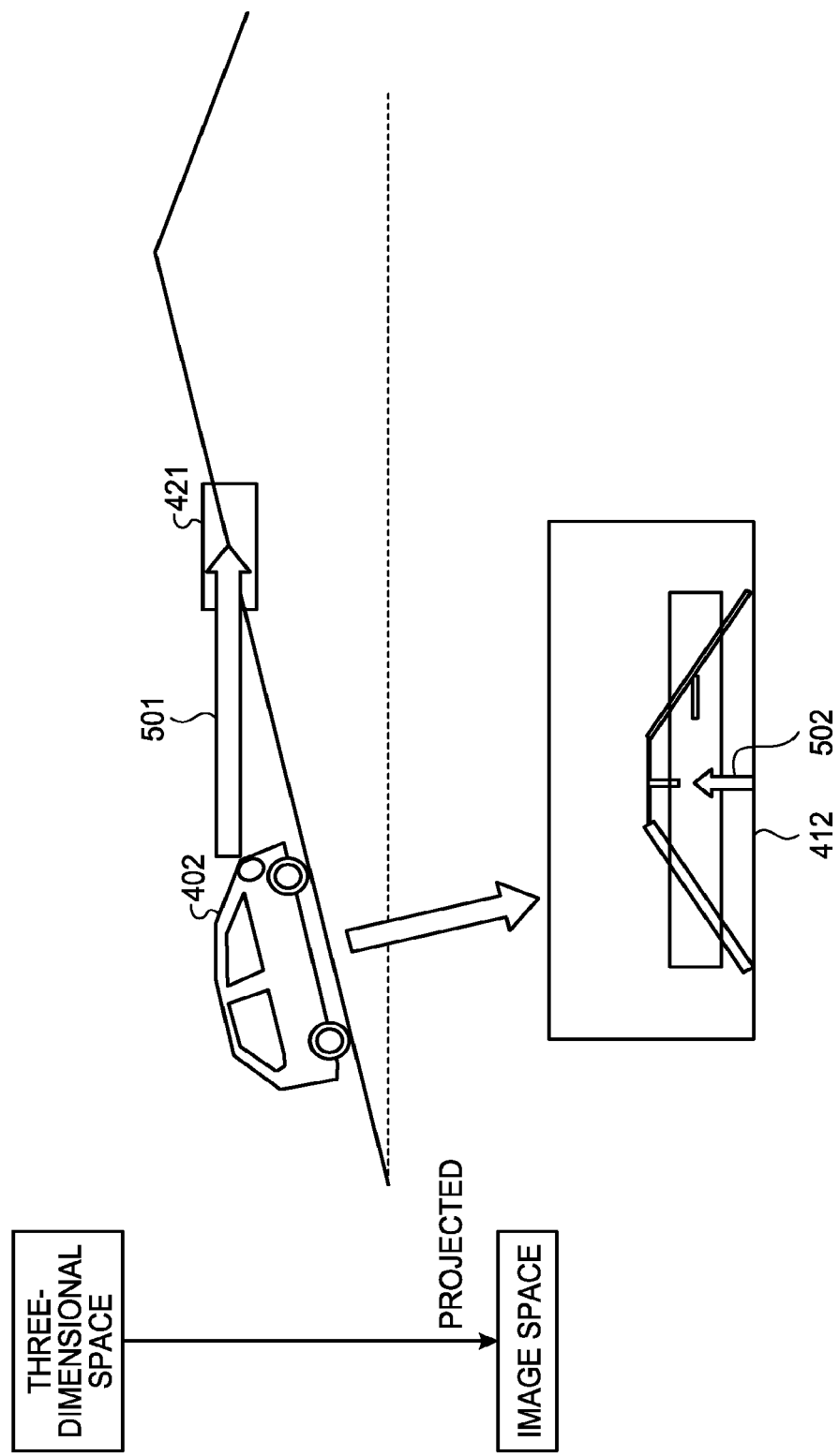
FIG. 4 is a view to describe a method of determining a gradient direction of a plane.

Returning to FIG. 2, the determination unit 202 determines a gradient direction of a plane on an acquired image. FIG. 4 is a view to describe a method of determining a gradient direction of a plane. For example, as illustrated in FIG. 4, the determination unit 202 determines, as a gradient direction of a plane on an image, a direction 502 obtained by projecting, on an image, a direction 501 of a straight line directed from an image acquisition position toward a region 421 for which a gradient is estimated on a three-dimensional space of the real world.

Figure 5:
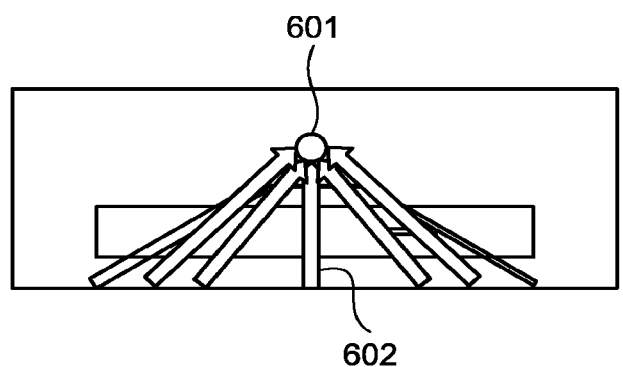
FIG. 5 is a view to describe a method of determining a gradient direction of a plane.
Figure 6:
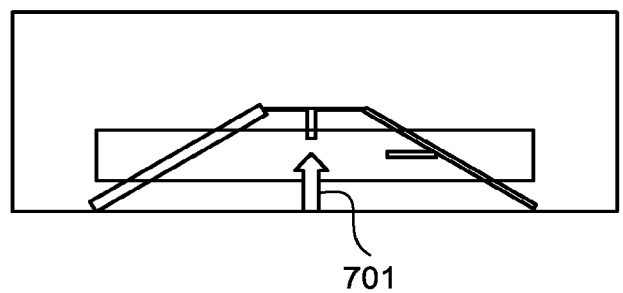
FIG. 6 is a view to describe a method of determining a gradient direction of a plane.

The method of determining a gradient direction of a plane is not limited thereto, and any method may be used. For example, as illustrated in FIG. 5, the determination unit 202 may determine, as a gradient direction of a plane, a direction 602 directed from one side of the image (for example, a lower end portion of an image) to a vanishing point 601. As illustrated in FIG. 6, the determination unit 202 may determine, as a gradient direction of a plane, an advancing direction 701 of the moving body 10 on an image. In a case where a facing direction in which the camera is installed is known in advance, a gradient direction of a plane can also be preliminarily fixed and set. For example, in a case where the camera is installed such that a photographing direction becomes parallel to a plane and conforms to a moving direction of the moving body 10, the determination unit 202 can preliminarily set, as a gradient direction, a direction from a lower side to an upper side of an image.

The extraction unit 203 extracts, from an image, pixels (a pixel column) in a direction different from the determined gradient direction. For example, the extraction unit 203 extracts, from one (first image) of two images, pixels (first pixels) indicating a boundary in the direction different from the gradient direction of the plane out of boundaries of objects photographed in this image. Additionally, the extraction unit 203 extracts, from the other one (second image) of the two images, pixels (second pixels) corresponding to the first pixels. For example, the extraction unit 203 may extract, from the second image, pixels (second pixels) indicating a boundary in a direction different from the gradient direction of the plane out of the boundaries of the objects photographed in this image.

The extraction unit 203 may extract, as a corresponding pixel, a second pixel matched with a first pixel while extracting, as a third pixel, a pixel existing on the coordinate of the second image and located at a coordinate same as the first pixel, and searching a periphery of the third pixel. Specifically, search can be made by a method such as block matching using pixels in the periphery of the first pixels. Besides, the extraction unit 203 may extract a point having large luminance change as a feature point on the second image, and may extract, as a second pixel corresponding to a first pixel, a center pixel of a feature point most similar to a feature amount in the periphery of the first pixel.

A direction different from the gradient direction may be preset as a direction of a range in which a pixel that influences gradient estimation accuracy can be excluded, for example. For example, a direction within the preset range from a direction perpendicular to the gradient direction can be set a direction different from the gradient direction. Consequently, it is possible to exclude a boundary extending in the gradient direction (or a direction close to the gradient direction) such as a white line painted on a road surface in an advancing direction on the road surface. Additionally, instead of such exclusion, a weight can be added in order to reduce the influence such that the closer to the perpendicular direction, the more the influence on a matching degree described below is increased. For example, a weight can be added to a linear shape in accordance with an angle while preliminarily setting a maximum value and a minimum value of the weight, and adding the maximum value in a case of being perpendicular to the gradient direction, and adding the minimum value in a case of being parallel to the gradient direction.

The boundary of the object in the direction different from the gradient direction is, for example, a boundary in a direction different from the advancing direction out of boundaries of objects such as a crack generated on a road surface, a line (stop line or the like) other than the line indicating the advancing direction, and a broken line painted in the advancing direction (a dashed center line or the like).

The boundary of the object can be detected by edge detection processing, for example. In other words, the extraction unit 203 extracts, as a pixel in a direction different from a gradient direction, a pixel located on an edge in a direction different from the gradient direction. With the edge detection processing, a pixel having intense luminance change in the gradient direction can be extracted.

Figure 7:
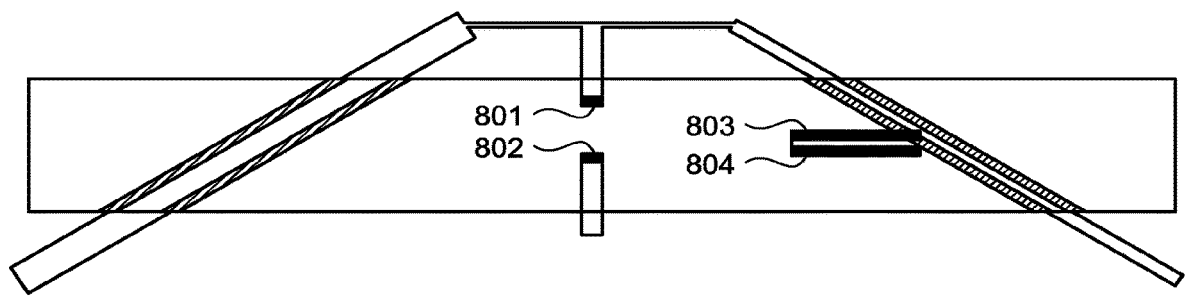
FIG. 7 is a view illustrating exemplary pixels to be extracted.

FIG. 7 is a view illustrating exemplary pixels to be extracted. FIG. 7 illustrates exemplary pixels (edge) 801 to 804 having intense luminance change and extracted in a case where a gradient direction is a vertical direction of an image. The pixels 801 and 802 are exemplary pixels detected as boundaries of objects corresponding to parts of a dashed center line. The pixels 803 and 804 are exemplary pixels detected as boundaries of objects corresponding to a crack made on a road surface. Thus, the number of pixels (pixel column) to be extracted may be plural or may be one.

In a case where a gradient direction is the vertical direction of an image, pixels on an edge in a lateral direction perpendicular to the vertical direction are pixels having more intense luminance change. In a case where the vertical direction is the gradient direction, the extraction unit 203 detects an edge in a horizontal edge larger than a threshold value by using an edge detection filter such as a Sobel filter that detects a horizontal edge, and then extracts a pixel on the edge as a pixel in the direction different from the gradient direction.

Meanwhile, the method of extracting pixels in the direction different from the gradient direction is not limited thereto. For example, in a case where a traffic lane detection function (lane detection function) is provided, the extraction unit 203 extracts, as pixels in the direction different from the gradient direction, an edge that is other than a white line and corresponds to a lane detected by the lane detection function from among edges detected from an image. Furthermore, the pixels in the direction different from the gradient direction may also be obtained from an acquired image by using a learning model subjected to learning in advance so as to extract and output pixels in the direction different from the gradient direction from an input image. The learning model may be any type of model such as a neural network model.

Returning to FIG. 2, the calculation unit 204 calculates gradient magnitude of a plane (gradient angle) by using the extracted pixels. For example, the calculation unit 204 transforms at least one of two images such that a matching degree between a pixel (first pixel) extracted from one (first image) of the two images and a pixel (second pixel) extracted from the other one (second image) becomes higher than that before transformation. The calculation unit 204 outputs, as an estimation value of the gradient magnitude, the gradient magnitude of the plane when the matching degree becomes higher.

In the following, a specific example of a gradient magnitude estimation method (calculation method) will be described. In the following, an exemplary case where one of two images is transformed and a matching degree with the other image is determined.

The calculation unit 204 transforms one of the two images by using a nomography matrix H(p) that can be calculated from: a certain gradient angle p; a translation vector T indicating a relative positional change between images; and a rotation matrix R indicating change of a posture. The calculation unit 204 estimates, as a gradient angle (gradient magnitude), a gradient angle p at which the matching degree between the transformed image and the other image becomes higher.

The homography matrix H(p) can be expressed similar to a homography matrix P (Expression (1)) of "Efficient Plane-parameter Estimation Using Stereo Images" by shigeki SUGIMOTO et al., Information Processing Society of Japan Transactions, Vol. 48, No. SIG1, pp. 24-34, February 2007 (non-patent document), for example. A normal vector n, a rotation matrix R, and a translation vector t on a plane of the non-patent document correspond to the gradient angle p, rotation matrix R, and translation vector T of the present embodiment. The rotation matrix R and the translation vector T can be acquired from, for example, a position and a posture of a photographing device provided to an image. A distance to a plane can be set as a fixed value in accordance with an installation height of the photographing device, for example.

Figure 8:
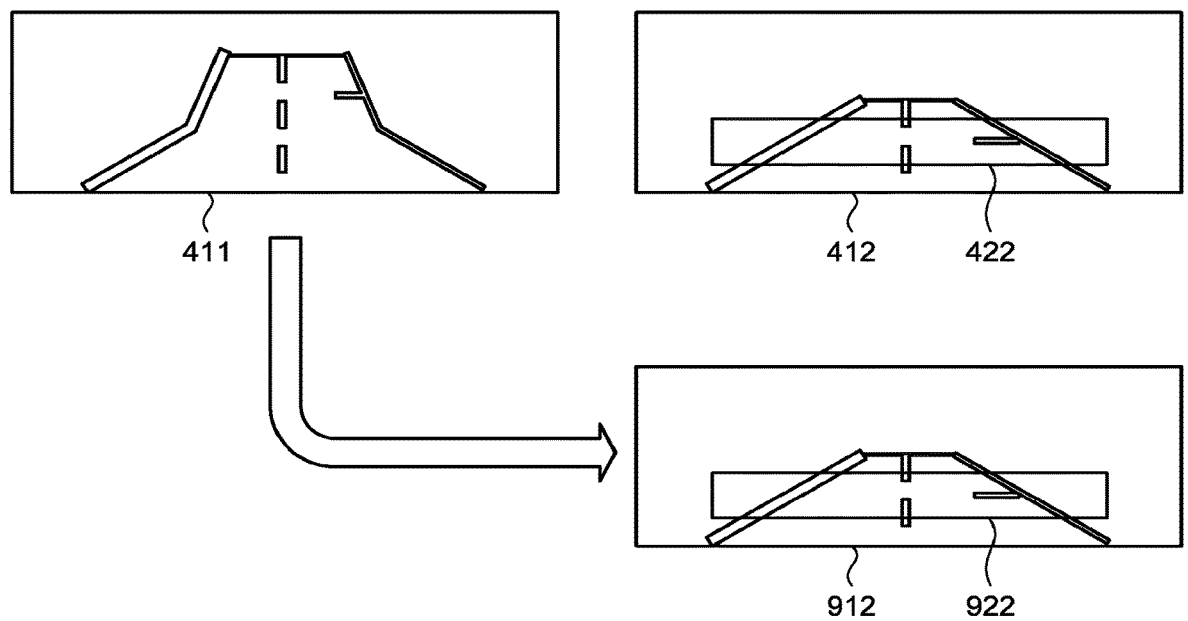
FIG. 8 is a view illustrating exemplary image transformation.
Figure 9:
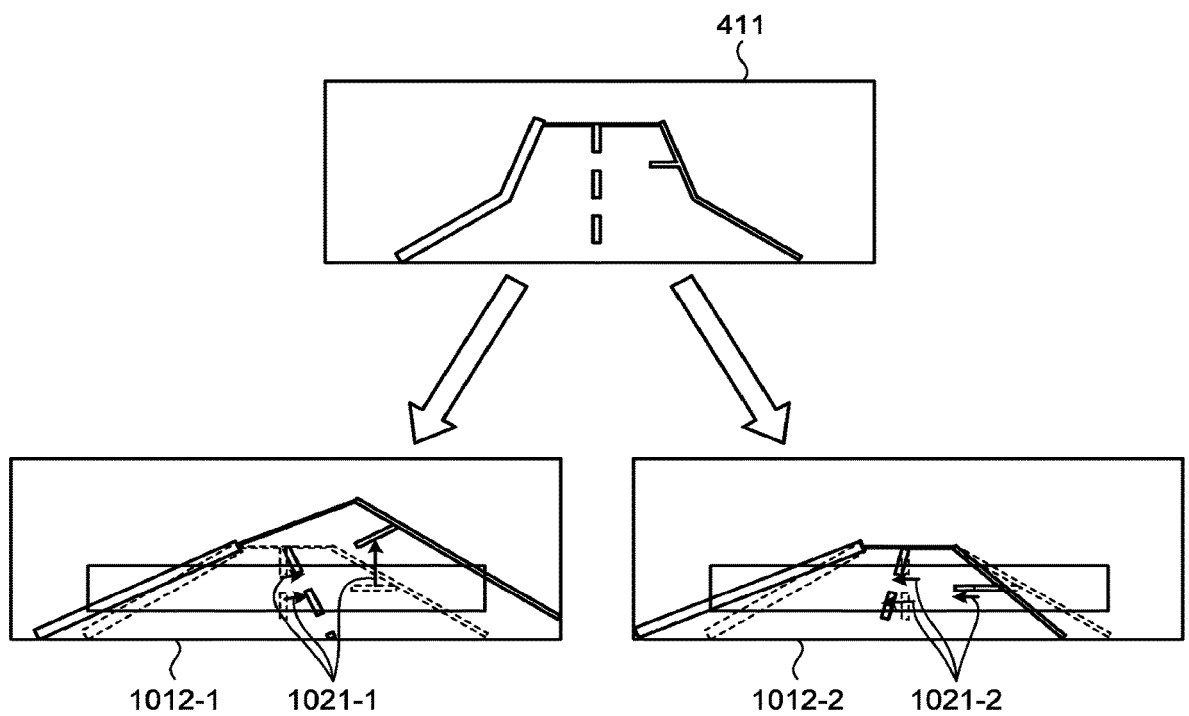
FIG. 9 is a view illustrating exemplary image transformation.

FIGS. 8 and 9 are views illustrating exemplary image transformation. FIG. 8 illustrates an example in a case where, out of the image 411 and the image 412 shown in FIG. 3, the image 411 is transformed to generate an image 912. Also, FIG. 8 illustrates an example in which there is no error in the translation vector T and the rotation matrix R and an estimated gradient angle p is equal to a true value. In a case where there is no error in the position and posture (translation vector T and rotation matrix R) of the estimated plane, images of estimated plane regions (for example, the region 422 in the image 412 and a region 922 in the image 912 after transformation) are matched.

FIG. 9 illustrates an example in which there are errors in the translation vector T and the rotation matrix R and an estimated gradient angle p is not equal to a true value. Solid lines in an image 1012-1 represent an image transformed by the homography matrix H(p1) calculated from p1 that differs from a true value of the gradient angle p. Dashed lines represent an image 412 displayed in order to easily view a matching result. Note that the image 412 to be compared is also displayed in a superimposed manner in FIG. 9. Each of arrows 1021-1 represents a matching result between a pixel in the direction different from the gradient direction in the image 1012-1 and a pixel in the direction different from the gradient direction in the image 412. An image 1012-2 represents an image transformed by a homography matrix H(p2) calculated from p2 close to the true value of the gradient angle p. Each of arrows 1021-2 represents a matching result between a pixel in the direction different from the gradient direction in the image 1012-2 and a pixel in the direction different from the gradient direction in the image 412.

Thus, the calculation unit 204 performs matching for a pixel in a direction different from the gradient direction between images in order to calculate a matching degree. For example, the calculation unit 204 performs matching between regions having similar feature amounts in a periphery of a pixel on the image. The periphery of a pixel is, for example, a region in a predetermined range including the pixel.

The feature amount may be luminance of an image or may be a feature amount such as a zero-mean normalized cross-correlation (ZNCC) calculated from luminance arrangement in the periphery of a pixel, or accelerated KAZE (AKAZE).

As illustrated in FIG. 9, an error is usually generated in the translation vector T and the rotation matrix R, and therefore, pixels are not completely matched even in a case of changing the gradient angle p like p1 and p2. For example, the calculation unit 204 determines, as an image having the highest matching degree, an image obtained by changing the gradient angle p and performing transformation by the gradient angle p at which a total distance between the pixels to be matched on the image is shortest. The calculation unit 204 outputs, as an estimation value of gradient magnitude, the gradient angle p that transforms the image to have the highest matching degree. Thus, the calculation unit 204 transforms one image by using a plurality of estimation values indicating gradient angles (gradient magnitude), and calculates a matching degree with the other image. The calculation unit 204 outputs, from among the plurality of estimation values, an estimation value having the matching degree higher than other estimation values.

The gradient magnitude estimation method is not limited thereto. Any method may be applied as far as a method can calculate the gradient magnitude at which a matching degree between a transformed image and a comparison image becomes higher.

For example, at the time of calculating a total distance on an image, the calculation unit 204 may add a weight to the distance such that the shorter a distance that is a feature amount used for matching is (the higher similarity between the feature amounts is), the more the distance is shortened. The calculation unit 204 may also use a matching degree at which the higher similarity of a feature amount between pixels to be matched is, the larger a value becomes. As disclosed in the non-patent document, the calculation unit 204 may use a method of calculating a plane parameter by decomposing a transformation parameter after obtaining a transformation parameter (nomography matrix H(p)) for image transformation.

In the example of FIG. 9, in a case of setting the gradient angle p1 as an estimation value, a distance that is a feature amount and a distance at a matching position on the image (length of arrow 1021-1) become long. On the other hand, in a case of setting the gradient angle p2 as an estimation value, the distance that is the feature amount and the distance at a matching position on the image (length of arrow 1021-2) become shorter than those in the case of setting the gradient angle p1 as the estimation value. The calculation unit 204 outputs, as an estimation value of gradient magnitude, the gradient angle p2 at which the matching degree becomes higher, for example.

Figure 10:
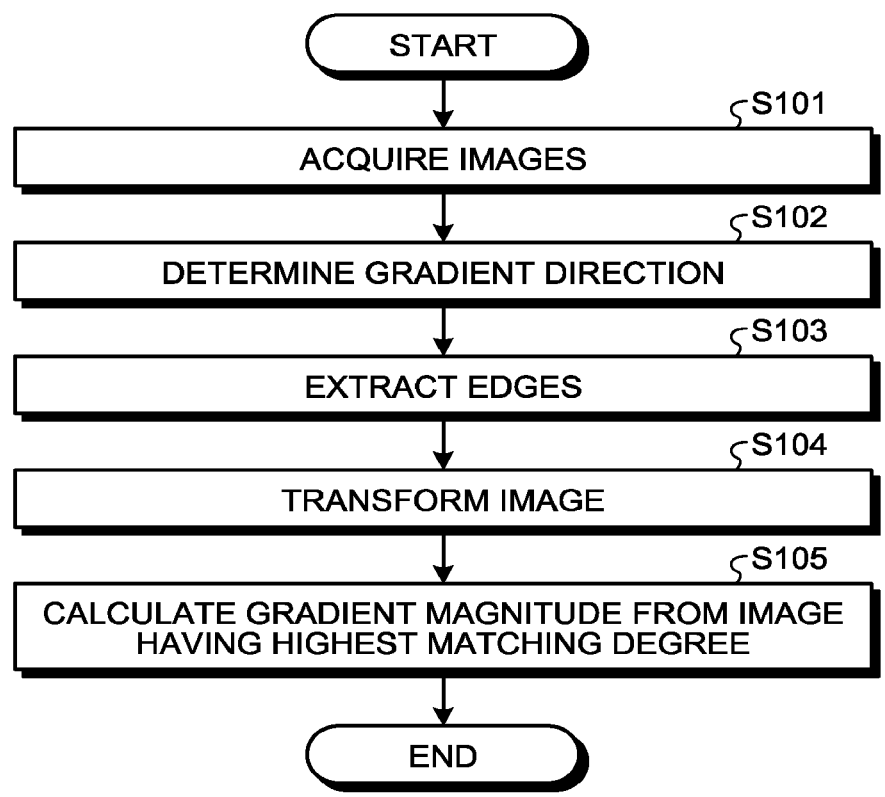
FIG. 10 is a flowchart of gradient estimation processing according to the first embodiment.

Next, the gradient estimation processing performed by the gradient estimation device 20 thus configured according to the first embodiment will be described with reference to FIG. 10. FIG. 10 is a flowchart illustrating exemplary gradient estimation processing according to the first embodiment.

First, the acquisition unit 201 acquires two images obtained by photographing a plane (step S101). The determination unit 202 determines a gradient direction of the plane on the acquired images (step S102). The extraction unit 203 extracts, from each of the two images, pixels in a direction different from the determined gradient direction (step S103). For example, the extraction unit 203 extracts an edge extending in the direction different from the gradient direction in each of the images. The calculation unit 204 transforms at least one of the two images (step S104). The calculation unit 204 calculates gradient magnitude on the basis of an image having a higher matching degree with the other image (step S105).

The estimated gradient magnitude may be used to control movement of the moving body 10, for example. For example, the power output controller 10G controls an acceleration rate and the like of the moving body 10 in accordance with the gradient magnitude. In a case where a different function based on a photographed image is provided, operation of the function may also be controlled in accordance with estimated gradient magnitude. For example, in a case where a function to detect an obstacle on a plane (obstacle detection function) is provided, whether to apply the obstacle detection function may be determined in accordance with estimated gradient magnitude.

Thus, in the gradient estimation device according to the first embodiment, gradient magnitude of a plane is estimated by determining a matching degree between pixels aligned in a direction different from the gradient direction of the plane. Consequently, influence of a white line extending in the gradient direction can be reduced and gradient estimation accuracy can be improved, for example.

Second Embodiment

A gradient estimation device according to a second embodiment enables setting for a region in an image used to estimate gradient magnitude.

Figure 11:
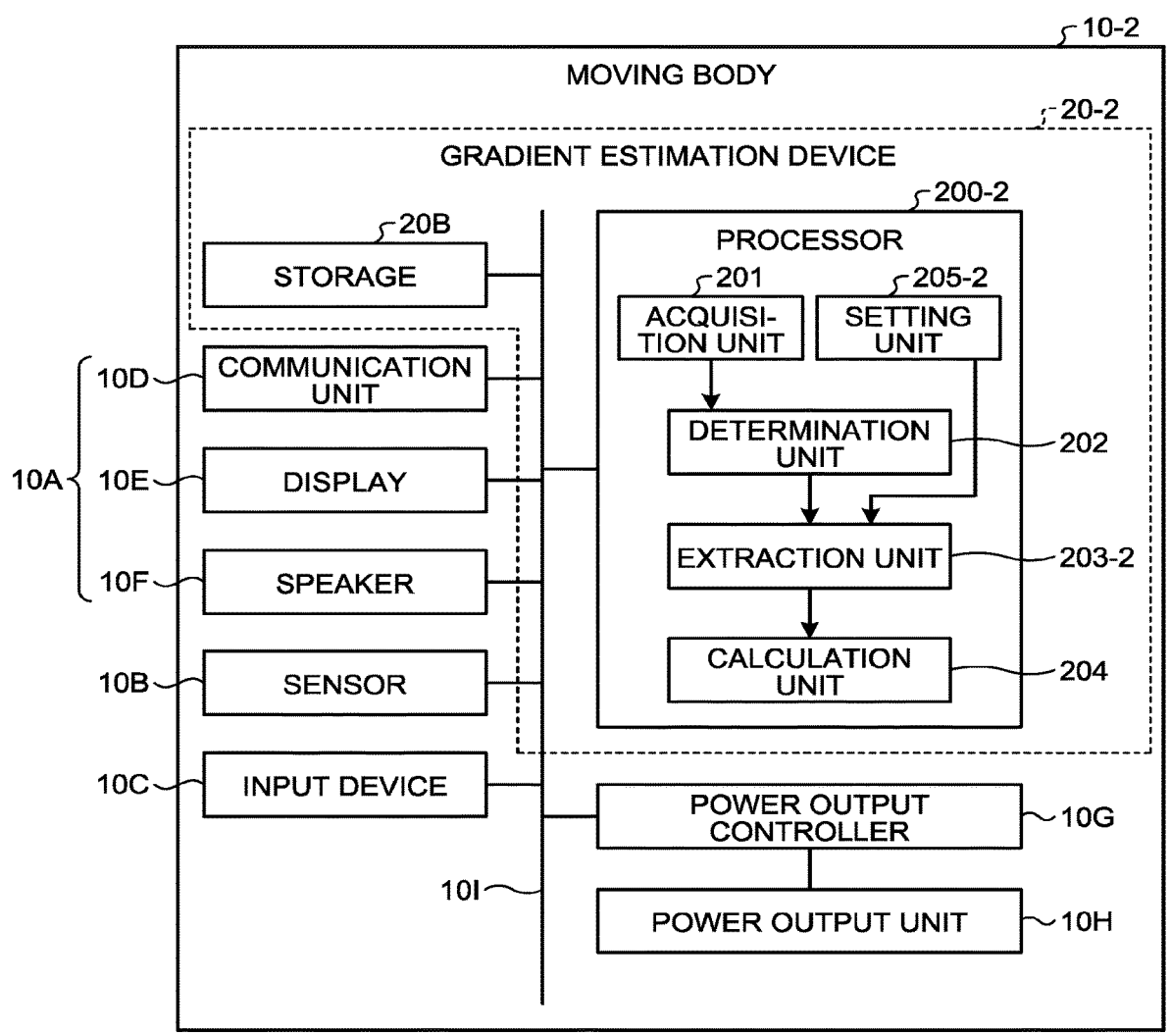
FIG. 11 is a diagram illustrating an exemplary functional configuration of a moving body according to a second embodiment.

FIG. 11 is a block diagram illustrating an exemplary configuration of the moving body 10-2 according to the second embodiment. A moving body 10-2 includes a gradient estimation device 20-2, an output unit 10A, a sensor 10B, an input device 10C, a power output controller 10G, and a power output unit 10H. The gradient estimation device 20-2 includes storage 20B and a processor 200-2.

The second embodiment differs from a first embodiment in that a setting unit 205-2 is added into the processor 200-2 and a function of an extraction unit 203-2 is different. Since other configurations and functions are similar to those of FIG. 1 that is a block diagram of a gradient estimation device 20 according to the first embodiment, the same reference signs are assigned thereto and a description thereof will be omitted.

The setting unit 205-2 sets a region in an image. A region to be set is, for example, a candidate region to be a candidate for a region including a plane. The number of candidate regions to be set may be one or plural. For example, the setting unit 205-2 may set a plurality of regions aligned in a gradient direction as the candidate regions. The setting unit 205-2 outputs the set candidate regions to the extraction unit 203-2.

Figure 12:
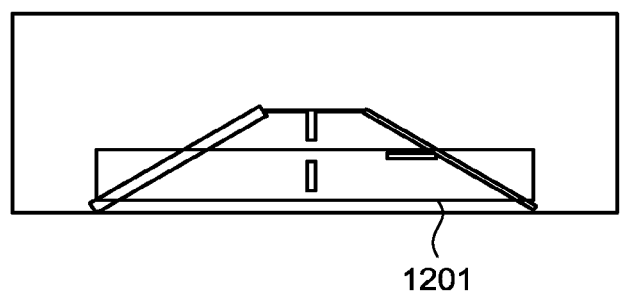
FIG. 12 is a view illustrating an exemplary candidate region to be set.
Figure 13:
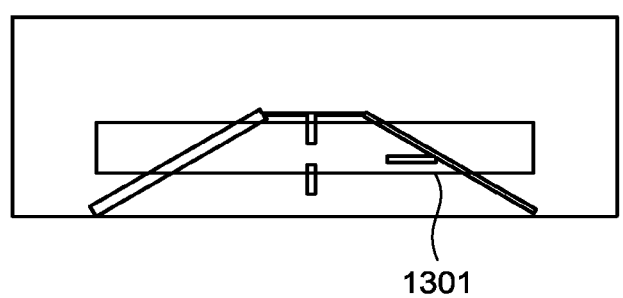
FIG. 13 is a view illustrating an exemplary candidate region to be set.

The setting unit 205-2 may set a preset region on an image as a candidate region, or may set a candidate region at a changed candidate position when a candidate position of a desired plane is changed. For example, a distance to a position where the gradient is desired to be acquired may be changed and also a position of a candidate region on an image may be vertically moved in accordance with a moving speed of the moving body 10-2. FIGS. 12 and 13 are views illustrating exemplary candidate regions to be set. FIG. 12 illustrates an example in which a candidate region 1201 is set at a bottom portion of an image in order to estimate gradient at a position closer to the moving body 10-2. FIG. 13 illustrates an example in which a candidate region 1301 is moved upward of an image in order to estimate gradient at a farther position than in FIG. 12.

Figure 14:
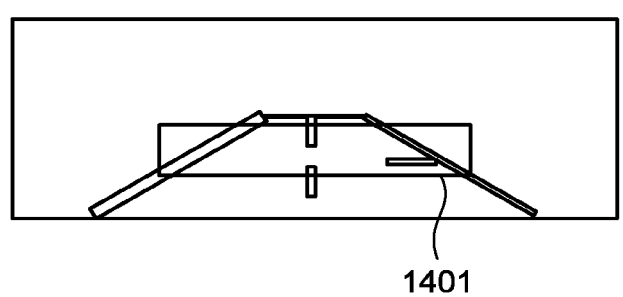
FIG. 14 is a view illustrating an exemplary candidate region to be set.

The setting unit 205-2 may set a candidate region by enlarging or reducing the candidate region. FIG. 14 is a diagram illustrating an exemplary candidate region 1401 set by reducing the candidate region. As illustrated in FIG. 14, the setting unit 205-2 may set the candidate region by reducing the same in a case where the candidate region is moved in an upward direction of a gradient.

Figure 15:
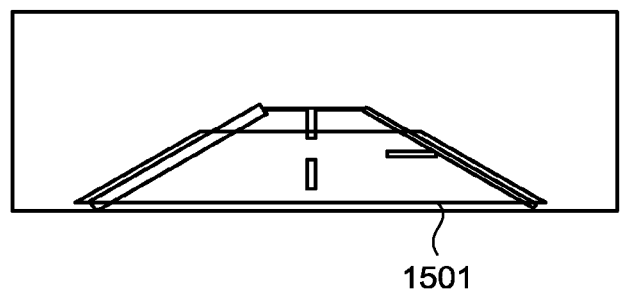
FIG. 15 is a view illustrating an exemplary candidate region to be set.
Figure 16:
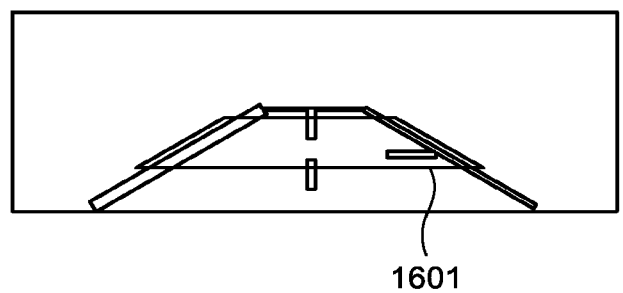
FIG. 16 is a view illustrating an exemplary candidate region to be set.

The setting unit 205-2 may detect a road surface from an image by a method to perform collation with a road surface pattern or the like, and may set a candidate region only within a detected road surface. FIGS. 15 and 16 are views each illustrating an exemplary candidate region set in a road surface. A candidate region 1501 in FIG. 15 illustrates an exemplary candidate region set in a trapezoidal shape along a road surface shape at a bottom portion of an image in order to estimate gradient at a position closer to the moving body 10-2. A candidate region 1601 in FIG. 16 illustrates an exemplary candidate region moved upward in the image and set in a trapezoidal shape along the road surface shape in order to estimate gradient at a position farther than in FIG. 15.

Figure 17:
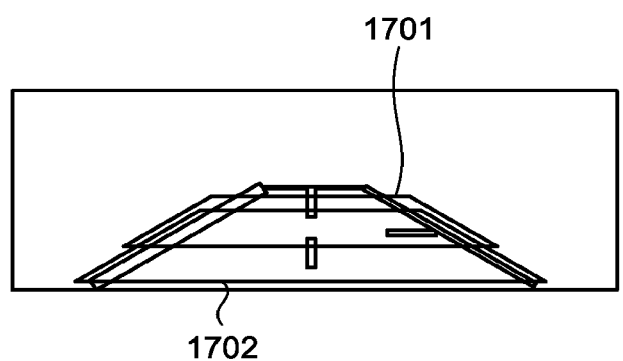
FIG. 17 is a view illustrating an example of setting a plurality of candidate regions.

FIG. 17 is a view illustrating an example of setting a plurality of candidate regions. FIG. 17 illustrates the example in which two candidate regions 1701 and 1702 are set.

Returning to FIG. 11, the extraction unit 203-2 differs from an extraction unit 203 of the first embodiment in extracting, from a region in each image set by the setting unit 205-2, a pixel in a direction different from a gradient direction.

Figure 18:
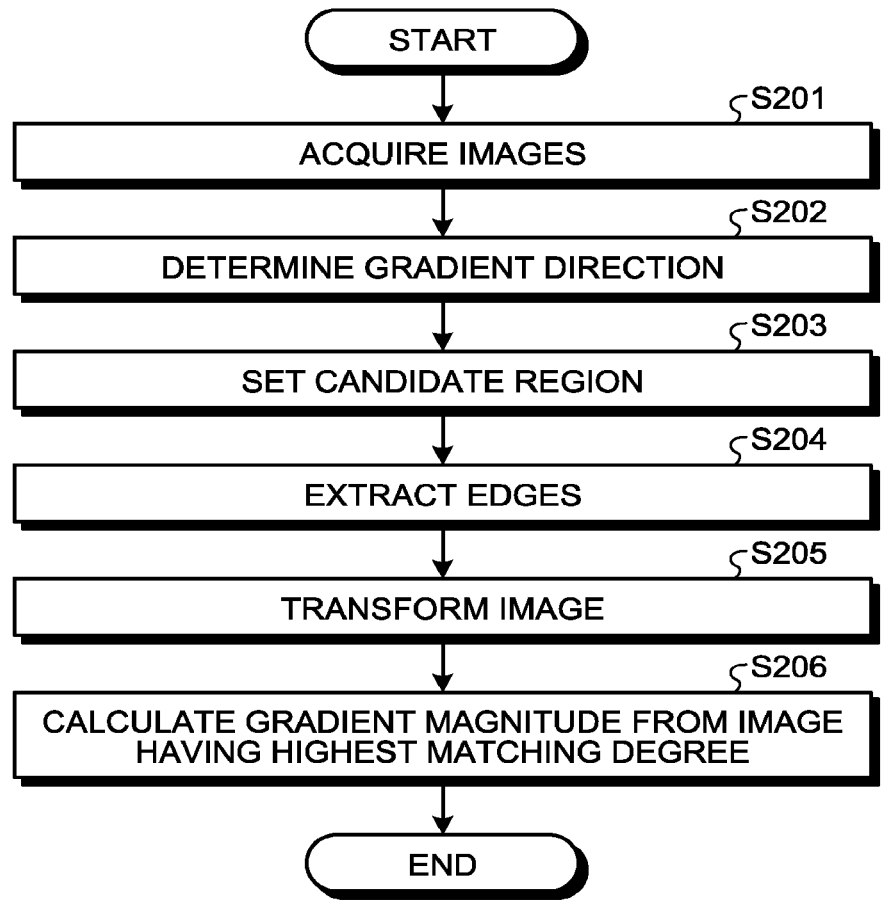
FIG. 18 is a flowchart of gradient estimation processing according to the second embodiment.

Next, gradient estimation processing by the gradient estimation device 20-2 thus configured according to the second embodiment will be described with reference to FIG. 18. FIG. 18 is a flowchart illustrating exemplary gradient estimation processing according to the second embodiment.

Since processing in steps S201 to S202 is similar to that in steps S101 to S102 in the gradient estimation device 20 according to the first embodiment, the description thereof will be omitted.

The setting unit 205-2 sets a candidate region of a plane in an acquired image (step S203). The extraction unit 203-2 performs edge extraction processing while setting the set candidate region as a target (step S204).

Since processing in steps S205 to S206 is similar to that in S104 to S105 in the gradient estimation device 20 according to the first embodiment, the description thereof will be omitted.

Note that, in a case where a plurality of candidate regions is set, a calculation unit 204 estimates gradient magnitude for each of the regions, and outputs each estimation value. For example, the calculation unit 204 outputs, without change, the gradient magnitude estimated for each of the regions. The calculation unit 204 calculates a difference in gradient magnitude between the respective regions (change in the gradient magnitude), and in a case where the difference is larger than a threshold value, the calculation unit 204 outputs output information indicating that there is a change point of the gradient magnitude. Also, a distance to the change point from a position of a region having such a change point on an image may be output.

Thus, in the gradient estimation device according to the second embodiment, a region in an image used to estimate gradient magnitude is set. Consequently, estimation accuracy for gradient magnitude of a plane can be further improved.

Meanwhile, in each of the above-described embodiments, it is assumed that a camera is installed horizontally with respect to a plane in a manner facing forward. In a case where an installation direction of a camera is different, a horizontal, perpendicular, vertical, or lateral directions may be changed in accordance with the installation direction.

As described above, according to the first and second embodiments, characteristic portions in the gradient direction can be matched by utilizing an image transformation result by using which a pixel in a direction different from a gradient direction of a plane is matched. As a result, improve estimation accuracy for gradient magnitude of a plane can be improved, and gradient estimation can be executed robust.

Figure 19:
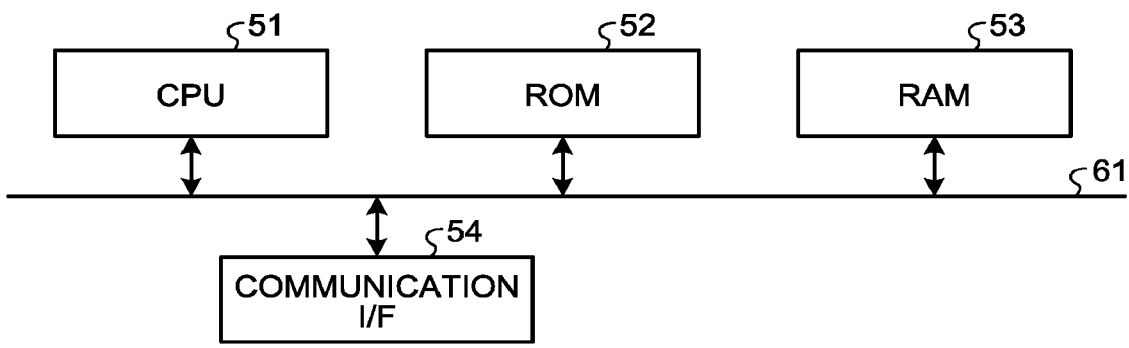
FIG. 19 is a hardware configuration diagram of a gradient estimation device according to the first or second embodiment.

Next, a hardware configuration of the gradient estimation device according to the first or second embodiment will be described with reference to FIG. 19. FIG. 19 is an explanatory diagram illustrating an exemplary hardware configuration of the gradient estimation devices according to the first or second embodiment.

The gradient estimation device according to the first or second embodiment includes a control device such as a central processing unit (CPU) 51, storage devices such as a read only memory (ROM) 52 and a random access memory (RAM) 53, a network communication I/F 54 to perform communication by being connected to a network, and a bus 61 to connect the respective units.

A program executed by the gradient estimation device according to the first or second embodiment is provided by being incorporated in advance in the ROM 52 or the like.

The program executed by the gradient estimation device according to the first or second embodiment may be recorded as a file in a computer readable storage medium, such as a compact disk read only memory (CD-ROM), a flexible disk (FD), a compact disk recordable (CD-R), a digital versatile disk (DVD), or the like, in a installable format or an executable format, and may be provided as a computer program product.

Additionally, the program executed by the gradient estimation device according to the first or second embodiment, a program may be stored on a computer connected to a network such as the Internet, and may be provided by being downloaded via the network. Furthermore, the program executed by the gradient estimation device according to the first or second embodiment may be provided or distributed via a network such as the Internet.

The program executed by the gradient estimation device according to the first or second embodiment may be capable of causing a computer to function as each unit of the above-described gradient estimation device. The computer can have the CPU 51 read and execute the program on a main storage device from a computer readable storage medium.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A gradient estimation device comprising:
   one or more processors configured to:
   acquire a first image and a second image obtained by photographing a surface of an object;
   extract, from the first image, a first pixel indicating a boundary of an object in a direction different from a gradient direction of the surface, and extract a second pixel corresponding to the first pixel from the second image;
   calculate a gradient magnitude of the surface by transforming at least one of the first image and the second image such that a degree of matching between the first pixel and the second pixel is increased; and
   set a plurality of regions aligned in the gradient direction;
   wherein the one or more processors
   transform the first image by using a plurality of estimation values each indicating gradient magnitude of the surface, determine which estimation value results in a highest degree of matching between the first pixel and the second pixel, and outputting, as the gradient magnitude of the surface, that estimation value determined to result in the highest degree of matching,
   extract the first pixel from a region of the first image corresponding to a set region, and extract the second pixel from a region of the second image corresponding to the set region, and
   calculate the gradient magnitude for each of the plurality of regions and further calculate a change in the gradient magnitude between plural pieces of gradient magnitude calculated for the plurality of regions.

2. The gradient estimation device according to claim 1, wherein
   the one or more processors extract, as the first pixel, a pixel on an edge in a direction different from the gradient direction.

3. The gradient estimation device according to claim 1, wherein
   the one or more processors determines the matching degree between the first pixel and the second pixel on the basis of similarity between a feature amount of a region including the first pixel and a feature amount of a region including the second pixel.

4. The gradient estimation device according to claim 3, wherein
   the one or more processors performs, on the basis of similarity, matching between the first pixel and the second pixel that are similar to each other, and determines the matching degree that becomes higher when a distance on an image between the first pixel and the second pixel to be matched becomes shorter.

5. The gradient estimation device according to claim 3, wherein
   the one or more processors determine the matching degree having a value that becomes larger when the similarity is higher.

6. The gradient estimation device according to claim 1, wherein
   the one or more processors acquire a transformation parameter to transform the first image such that the matching degree between the first pixel and the second pixel becomes higher, and calculates the gradient magnitude of the surface from the transformation parameter.

7. The gradient estimation device according to claim 1, wherein
   the one or more processors further configured to determine the gradient direction of the surface, and
   the one or more processors extract the first pixel indicating the boundary of an object in a direction different from the determined gradient direction.

8. A gradient estimation method comprising:
   acquiring a first image and a second image obtained by photographing a surface of an object;
   extracting, from the first image, a first pixel indicating a boundary of an object in a direction different from a gradient direction of the surface, and extracting a second pixel corresponding to the first pixel from the second image;
   calculating gradient magnitude of the surface by transforming at least one of the first image and the second image such that a degree of matching between the first pixel and the second pixel is increased;
   setting a plurality of regions aligned in the gradient direction;
   transforming the first image by using a plurality of estimation values each indicating gradient magnitude of the surface,
   determining which estimation value results in a highest degree of matching between the first pixel and the second pixel, and
   outputting, as the gradient magnitude of the surface, that estimation value determined to result in the highest degree of matching, wherein
   the extracting includes extracting the first pixel from a region of the first image corresponding to a set region, and extract the second pixel from a region of the second image corresponding to the set region, and
   the calculating includes calculating the gradient magnitude for each of the plurality of regions and further calculate a change in the gradient magnitude between plural pieces of gradient magnitude calculated for the plurality of regions.

9. A computer program product having a non-transitory computer readable medium including programmed instructions, wherein the instructions, when executed by a computer, cause the computer to perform:

acquiring a first image and a second image obtained by photographing a surface of an object;

extracting, from the first image, a first pixel indicating a boundary of an object in a direction different from a gradient direction of the surface, and extracting a second pixel corresponding to the first pixel from the second image;

calculating gradient magnitude of the surface by transforming at least one of the first image and the second image such that a degree of matching between the first pixel and the second pixel is increased;

setting a plurality of regions aligned in the gradient direction;

transforming the first image by using a plurality of estimation values each indicating gradient magnitude of the surface, determining which estimation value results in a highest degree of matching between the first pixel and the second pixel, and outputting, as the gradient magnitude of the surface, that estimation value determined to result in the highest degree of matching, wherein the extracting includes extracting the first pixel from a region of the first image corresponding to a set region, and extract the second pixel from a region of the second image corresponding to the set region, and the calculating includes calculating the gradient magnitude for each of the plurality of regions and further calculate a change in the gradient magnitude between plural pieces of gradient magnitude calculated for the plurality of regions.

10. A controlling system comprising:
one or more processors configured to:
  acquire a first image and a second image obtained by photographing a surface of an object;
  extract, from the first image, a first pixel indicating a boundary of an object in a direction different from a gradient direction of the surface, and extract a second pixel corresponding to the first pixel from the second image;
  calculate gradient magnitude of the surface by transforming at least one of the first image and the second image such that a degree of matching between the first pixel and the second pixel is increased, including transforming the first image by using a plurality of estimation values each indicating gradient magnitude of the surface, determining which estimation value results in a highest degree of matching between the first pixel and the second pixel, and selecting as the gradient magnitude of the surface that estimation value which results in the highest degree of matching; and
  control a movement of a moving body in accordance with the selected gradient magnitude, wherein
the one or more processors
  extract the first pixel from a region of the first image corresponding to a set region, and extract the second pixel from a region of the second image corresponding to the set region, and
  calculate the gradient magnitude for each of the plurality of regions and further calculate a change in the gradient magnitude between plural pieces of gradient magnitude calculated for a plurality of regions.

* * * * *